Jan. 31, 1956 J. D. MORRIS 2,733,294

PHASE DISCRIMINATOR

Filed Nov. 26, 1952 3 Sheets-Sheet 1

INVENTOR
JOHN D. MORRIS
BY Elmer J. Gorn
ATTORNEY

INVENTOR
JOHN D. MORRIS
BY Elmer J. Gorn
ATTORNEY

Jan. 31, 1956

J. D. MORRIS 2,733,294

PHASE DISCRIMINATOR

Filed Nov. 26, 1952

3 Sheets-Sheet 3

INVENTOR
JOHN D. MORRIS
BY Elmer J. Gorn
ATTORNEY

United States Patent Office 2,733,294

Patented Jan. 31, 1956

2,733,294

PHASE DISCRIMINATOR

John D. Morris, Allston, Mass., assignor to Raytheon Manufacturing Company, Newton, Mass., a corporation of Delaware Application November 26, 1952, Serial No. 322,613

6 Claims. (Cl. 178—69.5)

This invention relates to phase discriminators, and more particularly to those of the type in which the relative phases of two harmonically-related frequencies are compared to produce a voltage proportional to the phase difference and to circuits utilizing the voltage produced by such discriminators to control the frequency of the source of one of the two compared frequencies. It is frequently desirable to control the frequency of one oscillator by that of another having a harmonic relationship to it. It has been found relatively easy to divide down the higher frequency, and compare the resulting low frequency with the output of the low frequency standard in a device developing an error voltage that can be utilized to correct any deviation of the output of the control oscillator from the desired frequency. It has been found more difficult to compare a relatively high frequency with a lower harmonically-related reference frequency directly. In the case of sine waves, and to some extent with square waves and other nonsinusoidal wave forms, a low order multiplication, such as by a factor of four, has been used but with considerable loss in power and the use of complicated apparatus.

In the system of the invention, the phase difference between the two signals is sampled at intervals equal to the period of the standard signal, and a voltage is derived proportional to this difference that is used to correct the frequency of the control oscillator in the direction necessary to correct the phase difference in the next period of the control oscillator's output. In obtaining this error voltage, averaging is utilized to reduce the effect of minor variations in frequency. The phases are compared in a phase discriminator in which the controlled signal is integrated in an integrating circuit and clamped to a reference potential through parallel rectifiers of opposing polarity. This clamping action shifts the D. C. component of the integrated voltage across the integrating circuit. The resultant voltage across the integrating circuit is applied to the frequency control circuit of the controlled oscillator to keep it at the control frequency or an integral multiple or submultiple of that frequency.

Such a system permits the controlled oscillator to continue to operate at its last control frequency through short interruptions of the controlling oscillator output. The system of this invention responds only to relatively slow changes in frequency due to the integrating circuit. The circuit permits what is, in effect, a very high order of frequency multiplication with a minimum of parts, much less, for instance, for a multiplication by factor of 8, than would be required for a series of frequency doublers.

Other and further objects and advantages of the invention will become apparent as the description thereof progresses, reference being had to the accompanying drawings, wherein:

Fig. 1 is a schematic diagram of a frequency multiplier utilizing the invention;

Fig. 2*a* is a time voltage diagram of the relative phases of the two frequencies when they are in phase;

Fig. 2*b* is a similar diagram of the relative phases when the high frequency lags the controlling frequency;

Fig. 2*c* is a similar diagram when the controlled frequency leads the controlling frequency;

Fig. 3*a* is a time diagram of the output voltage of the discriminator when the two frequencies are in phase;

Fig. 3*b* is a voltage time diagram of the output of the discriminator when the control frequency lags the controlling frequency;

Fig. 3*c* is a voltage time diagram of the output of the discriminator when the controlled frequency leads the controlling frequency;

Figure 1:
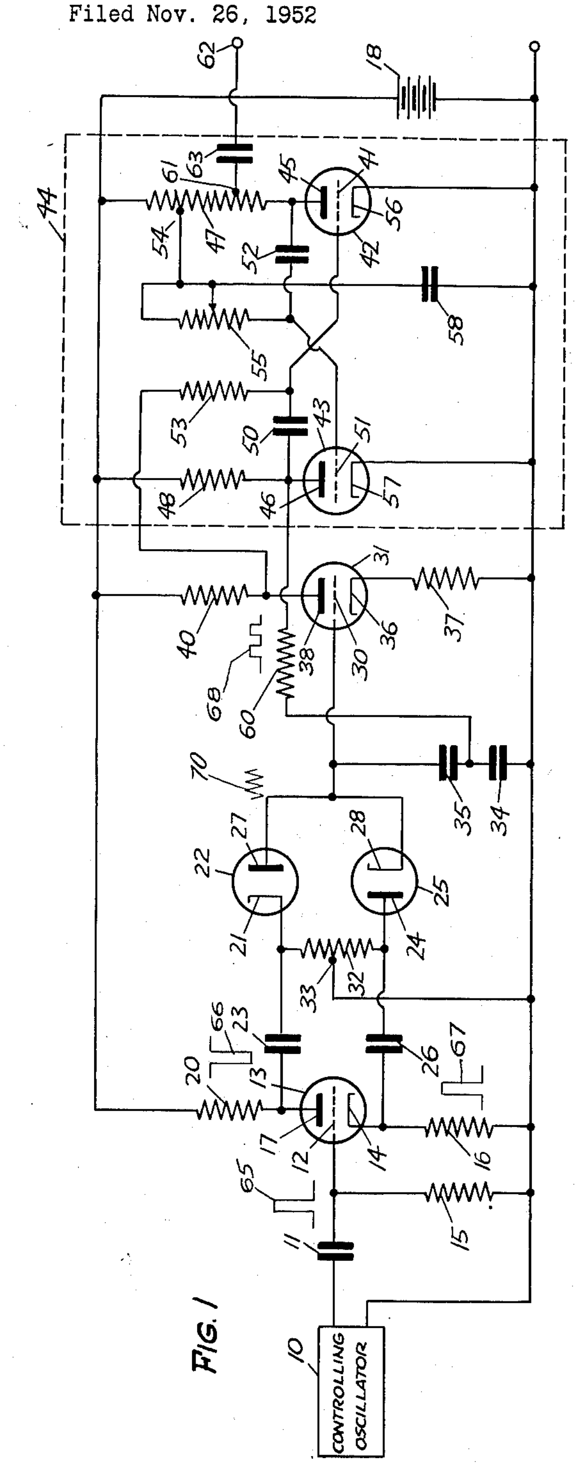

In Fig. 1, the numeral 10 designates the controlling oscillator, the output of which is coupled through capacitor 11 to the grid 12 of an inverter tube 13. The grid 12 of the tube 13 is connected to the cathode 14 through resistors 15 and 16. The plate 17 is connected to a source 18 of positive potential through a resistor 20, and is also coupled to the cathode 21 of a diode 22 through a capacitor 23. The cathode 14 is coupled to the plate 24 of a second diode 25 through a capacitor 26. The plate 27 of diode 22 and the cathode 28 of diode 25 are connected together and to the grid 30 of a tube 31. The cathode 21 of the diode 22 and the plate 24 of the diode 25 are connected by a resistor 32, the center tap 33 of which is coupled through capacitors 34 and 35 to the plate 27 of the diode 22 and the cathode 28 of the diode 25. The grid 30 of the tube 31 is connected to the cathode 36 through capacitors 34 and 35 and a resistor 37. The plate 38 is connected to the source 18 of positive potential through a resistor 40. The plate 38 is also connected to the grid 41 of tube 42 connected with tube 43 as a multivibrator 44. Plates 45 and 46 of tubes 42 and 43 are connected to the source 18 of positive potential through resistors 47 and 48, respectively. The plate 46 of tube 43 is coupled to the grid 41 of tube 42 through capacitor 50, and the plate 45 of tube 42 is coupled to the grid 51 of the tube 43 through capacitor 52. The grid 41 of the tube 42 is connected to the plate 38 of tube 31 through resistor 53. The grid 51 of tube 43 is connected to a tap 54 on the resistor 47 through a variable resistor 55. The tap 54 is coupled to the cathodes 56 and 57 of the tubes 42 and 43 through a capacitor 58. The plate 46 of the tube 43 is connected to the junction between the capacitors 34 and 35 through a resistor 60. A tap 61 on a resistor 47 is coupled to the output terminal 62 through a capacitor 63.

Figures 2A, 2B, 2C, 3A, 3B, 3C, 4:
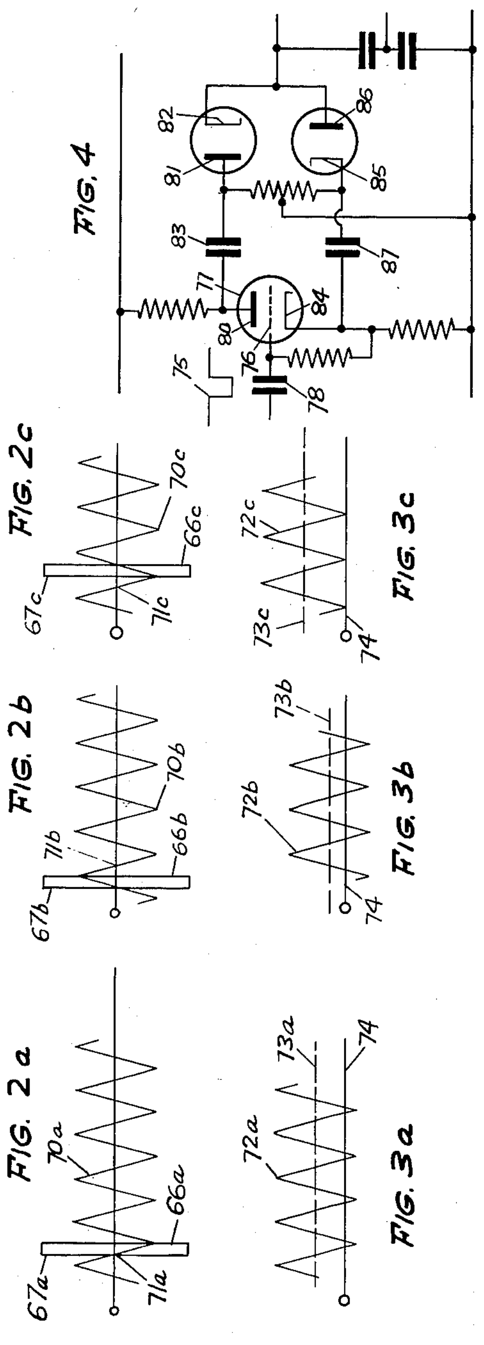
Fig. 4 is a modification of the discriminator of the invention used with a negative-going train of controlling pulses.

In operation, the controlling oscillator 10 produces pulses at a low frequency rate, assumed for this example to be at a one kilocycle rate. These pulses have a high amplitude and a short duration with a steep leading edge, such as the positive-going pulse form 65 shown near the grid 12 of the phase splitter tube 13. Such pulses produce a train of negative-going pulses, such as the pulse form 66 at the plate 18 of the tube 13, and a train of positive-going pulses of equal amplitude and similar shape to the pulse 66, such as the pulse form 67 which appears across the cathode load resistor 16. These pulses 66 and 67 are coupled through capacitors 23 and 26, respectively, to the cathode 21 of tube 22 and the plate 24 of the tube 25. The multivibrator 44 of this example is assumed to operate at a rate of sixteen kilocycles to produce pulses of the wave form 68, which are integrated in the circuit comprising resistor 60 and capacitor 34, to form a saw-toothed wave form 70 at the plate 27 of diode 23, and the cathode 28 of diode 25, and also at the grid 30 of the control tube 31. At the frequencies selected for this example, the controlled oscillator completes sixteen cycles for each input pulse from the controlling oscillator. The phase relationships of these pulses are best shown in Figs. 2*a*, 2*b*, and 2*c*, in which the sixteen kilocycle oscillations are shown as wave forms 70*a*, 70*b*, and 70*c* of triangular shape, and the one kilocycle pulses of both polarities as pulses 67*a*, 67*b*, and 67*c* for the positive polarity, and pulses 66*a*, 66*b*, and 66*c* for those of negative polarity. If the tube oscillators are exactly synchronized, the one kilocycle pulses 66*a* and 67*a* will always occur at exactly the same relative position on the sixteen kilocycle wave 70*a*. Preferably, the circuit is adjusted so that the one kilocycle pulses 66*a* and 67*a* will always occur when the sixteen kilocycle 70*a* wave is passing through the zero axis going negative, that is, at the point 71*a* in Fig. 2*a*. However, if there is a slight change in the rate of either signal, the phase relationship will shift. The purpose of the phase discriminator is to utilize this phase shift to generate control voltages which, when applied to the multivibrator, will alter the frequency in the proper direction to reestablish the original phase relationship and thereby assure locking.

For this purpose, the one kilocycle input signal 66 and 67 appears on one side of the two diodes 22 and 25, and the sixteen kilocycle wave 70, the phase of which is to be compared with that of the one kilocycle wave, appears on the opposite side; each one kilocycle pulse transfers a charge of electrons from capacitor 23 through the diodes 22 and 25 to capacitor 26. This transfer leaves capacitor 23 with a positive potential, plus 50 volts in a representative case, on the cathode 21 of diode 22, and an equal negative potential on the plate 24 of the diode 25. As a result, these diodes are nonconducting between pulses and appear as infinite impedances to the sixteen kilocycle wave present on the right-hand side of the diodes, as seen in Fig. 1. However, some of the transferred charge will leak back through the high value resistor 32 and, on the next one kilocycle pulse, conduction will occur near the peak of the pulse to again transfer the leaked charge by way of the diode path. During the short interval of conduction at the peak of each input cycle, the diode impedances change from infinity to near zero. Also, the voltage drop across each diode drops to nearly zero. As a consequence, an action takes place which clamps the right-hand side of the diode to the same voltage as the center tap of the resistor 34 on the left-hand side, that is, to zero potential. At the end of the pulse, the impedance returns to infinity and the sixteen kilocycle wave continues at a new D. C. level determined by the point of the cycle which was clamped to ground by the short pulse, that is, by the phase difference between the two waves.

It may be seen that the signal on the grid 30 of the control tube 31 consists of a sixteen kilocycle triangular wave 70, as shown in Figs. 3*a*, 3*b* and 3*c*. The D. C. operating level 73 of this wave is near the zero line 74. This level shifts slightly positive or negative as the phase relationships between the one kilocycle and sixteen kilocycle signals vary. When the sixteen kilocycle wave form passes zero going negative at a point 71*b*, after the one kilocycle pulses 66*b* and 67*b* have occurred, as shown in Fig. 2*b*, the level 73*b* of the triangular wave form 72*b*, applied to the grid 30 of the tube 31, drops closer to zero to produce a higher voltage on the plate 41 that, when applied to the multivibrator 44, serves to increase its frequency and bring it back into phase with the one kilocycle frequency of the controlling oscillator. When the point 71*c* occurs earlier than the leading edge of the one kilocycle waves 66*c* and 67*c*, the average level 73*c* of the wave form 72*c* increases and a lower voltage is applied to the multivibrator 44 to reduce its frequency and bring it back into phase with the one kilocycle frequency of the controlling oscillator. For best results, the pulses of the controlling oscillator should be of high amplitude relative to the control pulses and of a duration less than half the period of controlled oscillations. The controlling oscillations, as applied to the discriminator, should be symmetrical about the zero axis. The output of the controlling oscillator may be negative-going pulses if the polarity of the diodes is reversed, as shown in Fig. 4. In this modification, negative-going pulses 75 are applied to the grid 76 of the phase-splitting tube 77 through a capacitor 78. The plate 80 of the tube 77 is coupled to the plate 81 of the diode 82 through a capacitor 83, and the cathode 84 of the tube 77 is coupled to the cathode 85 of the diode 86 through a capacitor 87. The rest of the circuit is the same as that shown in Fig. 1. The operation is the same except for the polarity of the pulse 75 and the polarity of the diodes.

Figure 5:
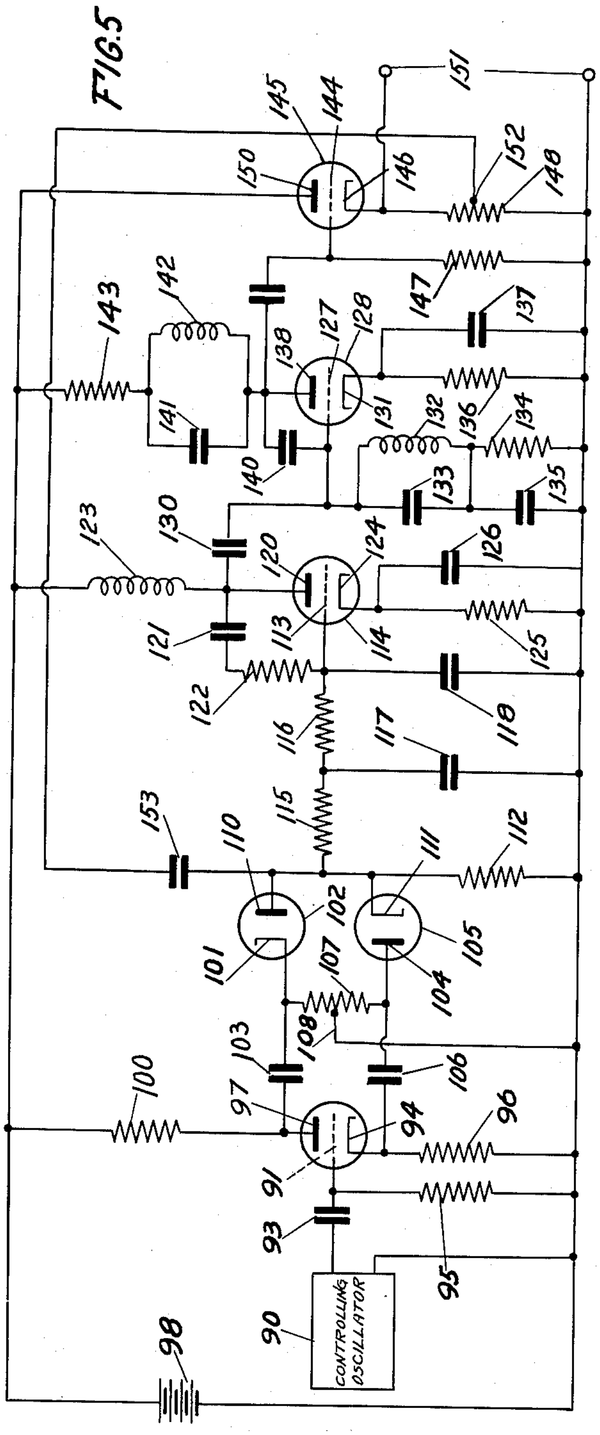
Fig. 5 is a circuit embodying the invention where a sine wave oscillator is controlled by the discriminator of the invention.

The phase discriminator circuit of this invention can also be used to control a sinusoidal oscillator, as shown in Fig. 5. A controlling oscillator 90 is coupled to the grid 91 of a phase-splitter tube 92 through a capacitor 93. The grid 91 is connected to the cathode 94 through resistors 95 and 96. The plate 97 is connected to a source 98 of positive potential through a resistor 100. The plate 97 is also coupled to the cathode 101 of a diode 102 through a capacitor 103. The cathode 94 is coupled to the plate 104 of a diode 105 through a capacitor 106. The cathode 101 of diode 102 is connected to the plate 104 of diode 105 through a resistor 107 having a center tap 108. The plate 110 of the diode 102 and the cathode 111 of the diode 105 are connected together and to the center tap 108 through a resistor 112. The plate 110 and cathode 111 are also connected to the grid 113 of a reactance tube 114 through an integrating circuit comprising series resistors 115 and 116 and shunt capacitors 117 and 118. The grid 113 of the tube 114 is coupled to the plate 120 through a capacitor 121 and a resistor 122. The plate 120 is connected to the source 98 of positive potential through an inductance 123. The cathode 124 is returned to the negative side of the source 98 through a resistor 125 shunted by a capacitor 126. The plate 120 is coupled to the grid 127 of an oscillator tube 128 through a capacitor 130. The grid 127 is also coupled to the cathode 131 through a tuned circuit comprising an inductance 132 and a capacitor 133, a resistor 134 shunted by a capacitor 135, and a resistor 136 shunted by a capacitor 137. The grid 127 is coupled to the plate 138 through a capacitor 140. The plate 138 is coupled to the source 98 of positive potential through a tuned circuit comprising a capacitor 141 and inductance 142 in series with a resistor 143. The plate 138 is also coupled to the grid 144 of a tube 145 through a capacitor 149. The grid 144 is connected to the cathode 146 through resistors 147 and 148. The plate 150 is connected to the source 98 of positive potential, and the cathode 146 is connected to an output terminal 151. A tap 152 on the resistor 148 is coupled through capacitor 153 to the plate 110 and cathode 111 of diodes 102 and 105, respectively.

The operation of this circuit is much the same as that of the circuit shown in Fig. 1, except that the frequency to be controlled is obtained from a sine wave oscillator, preferably of the tune-grid tune-plate type, such as that illustrated in association with the tube 128. A reactance tube circuit, such as that shown in Fig. 5 associated with the tube 114, can be used to control the frequency of the oscillator in response to the control voltage developed by the phase discriminator and integrator circuits and applied to the grid 113 of the reactance tube 114 to correct the phase of the oscillator. This control voltage could also be used to operate a servo-driven variable tuning element, such as a capacitor, in the frequency-determined circuits of the controlled oscillator. The controlling frequency can be higher or lower than the controlled frequency but the frequencies must be equal or harmonically related.

Figure 6:
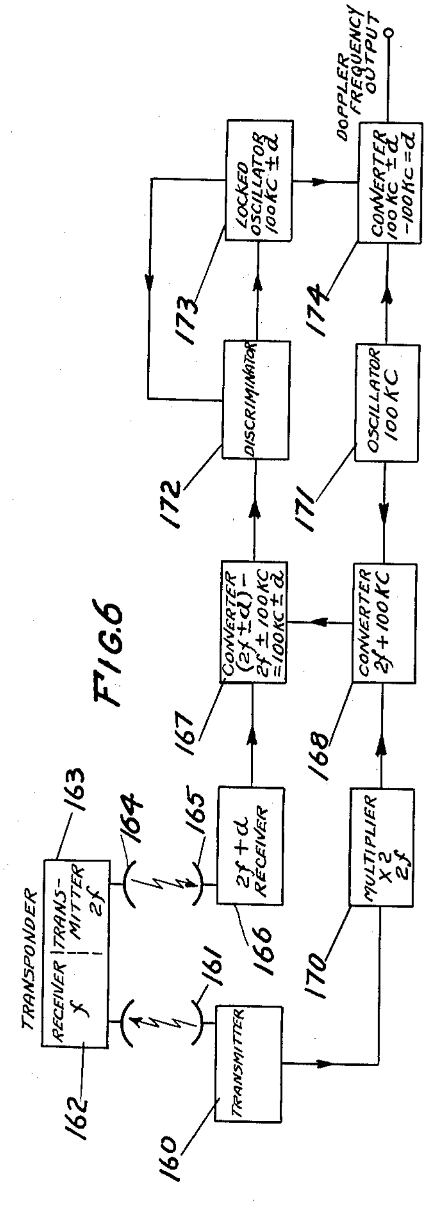
Fig. 6 is a circuit utilizing the discriminator of the invention in a beacon system to derive the Doppler frequency that is proportional to the relative velocity of the beacon and transponder units of the system.

The discriminator of the invention may also be used in a beacon system that produces a frequency proportional to the relative velocity of the beacon and transponder elements of the system. Such a system is shown in Fig. 6. In Fig. 6, the reference numeral 160 designates the transmitter of the beacon which transmits energy at a frequency $f$ by means of an antennt 161 to the receiver 162 of the transponder. Upon receipt of this signal, the transmitter 163 of the transponder is caused to produce a signal of a frequency $2f$ by well-known means, and transmits it by antenna 164 to the antenna 165 of the receiver 166, where due to the Doppler effect, the signal has the frequency $2f \pm d$. As is well known, the Doppler effect is the shift in frequency due to the relative velocity of a transmitter and a receiver. If the transmitter and receiver are moving apart, the frequency is reduced, while if they are moving together, the frequency is increased. The output of the receiver 166 is applied to a converter 167. The converter also receives the output of a second converter 168. The second converter 168 receives a portion of the output of the transmitter 160 after multiplication by some integral factor, in this case 2, in a multiplier 170, to give an output of the frequency $2f$. The output of an oscillator 171 of a frequency of one hundred kilocycles is also applied to the second converter to give an output of a frequency $2f+100$ kilocycles, which is also applied to the first converter 167, together with the incoming signal, to produce an output $(2f \pm d)-(2f+100$ kilocycles$)=100$ kilocycles $\pm d$. This output is applied to the input of a phase discriminator 172 of the type shown in Fig. 1. This phase discriminator compares the output of the converter 167 with the output of a voltage sensitive oscillator 173 of any convenient type, such as those shown in Figs. 1 and 5, having an uncontrolled frequency of a relatively low radio frequency, in this case one hundred kilocycles, that can be shifted by the expected range of values of the Doppler frequency. The result of the comparison of the phase of these two signals is to produce a voltage in the manner described above in connection with Figs. 1 and 5 to produce an output from the oscillator 173 that has a frequency of one hundred kilocycles $\pm d$ and follows the variation in the value of the Doppler frequency. The output of this locked oscillator 173 is applied to the third converter 174, which also receives a portion of the output of the one hundred kilocycle oscillator 171 to produce a frequency equal to the Doppler frequency at its output terminal 175. This output can be converted to a voltage proportional to the relative velocity of the transponder and the beacon. This voltage, in turn, can be read directly as velocity on a properly calibrated meter, or used for any other purpose. The circuit, as shown, converts the carrier frequency to lower frequencies before deriving the Doppler frequency. While this preliminary conversion could be eliminated, it has been found easier to operate the phase discriminator of the invention at these lower frequencies.

Figure 7:
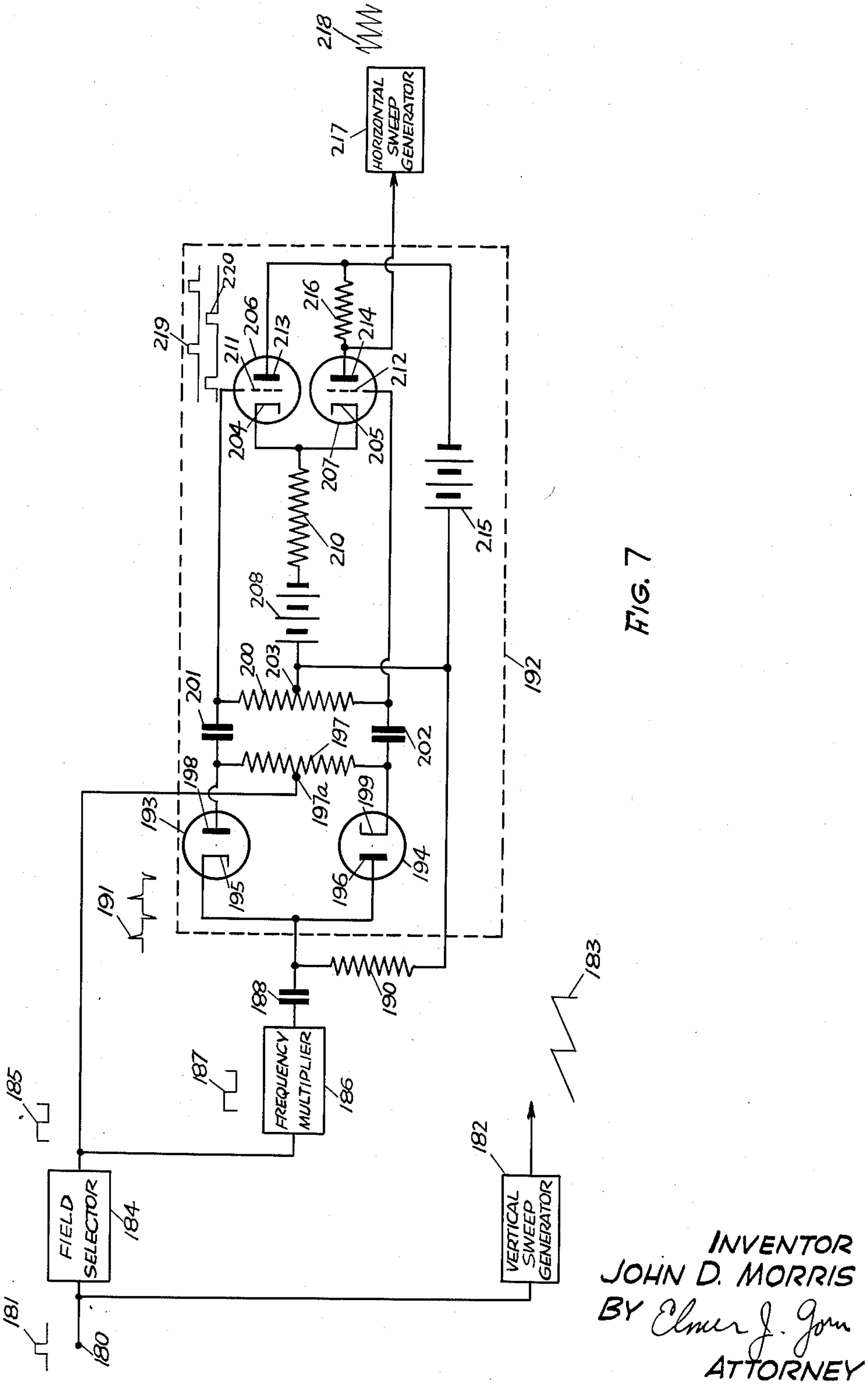
Fig. 7 illustrates the use of the discriminator of the invention in a television receiver to derive the horizontal synchronizing pulses from the vertical synchronizing pulses.

Fig. 7 shows how the discriminator of the invention may be used in a television receiver to derive pulses at the horizontal repetition rate properly interlaced from transmitted synchronizing pulses at the vertical repetition rate. In Fig. 7, the reference numeral 180 indicates the input terminal at which the vertical synchronizing signals, indicated by the wave form 181, appear and are applied directly to the vertical sweep generator 182 to produe the vertical sweep of the wave form 183. The vertical synchronized pulses 181 are also applied to a field selector circuit 184 comprising a multivibrator of the type that produces one pulse for every two input pulses to give a train of pulses at the frame rate of thirty cycles per second having the wave form 185. These pulses are applied to a frequency multiplier 186, of the type shown in Fig. 1, in which the sixty cycle per second vertical synchronizing pulses replace the one kilocycle pulses and are applied in phase opposition to the input to the diodes, while a multivibrator having a free-running frequency of about 15,750 cycles per second is provided in place of the multivibrator 44 of Fig. 1. The ouput of this multivibrator is applied to the output of the diodes after integration to produce a voltage that is used to control the frequency of the output of the high frequency oscillator; in this case the frequency of this output is 15,750 cycles per second; the horizontal scan rate is derived representing a multiplication of the thirty cycle frame rate by 525. This output is represented by the wave form 187, and is differentiated in the differentiator circuit comprising a series capacitor 188 and a shunt capacitor 190 to produce the wave form 191, which is applied to a pulse polarity selector circuit 192 to produce interlaced frames of horizontal synchronizing pulses. This pulse polarity selector circuit comprises a pair of diodes 193 and 194 with the cathode 195, and a plate 196 of the diode 193 and 194, respectively, connected together and to the capacitor 188. A resistor 197 is connected between the plate 198 and the cathode 199 of the diodes 193 and 194, respectively. A pulse of the output of the field selector 184 is connected to a center tap **197*a* on the resistor 197. The ends of this resistor are connected to the ends of a resistor 200 through capacitors 201 and 202. A center tap 203 on the resistor 200 is connected to the resistor 190 and to the cathodes 204 and 205 of a pair of triodes 206 and 207 through a source 208 of negative potential and a resistor 210. The ends of the resistor 200 are connected directly to the grids 211 and 212 of the tubes 206 and 207, respectviely. The plates 213 and 214 of these tubes are connected to the center tap 203 of resistor 200 through a source 215 of positive potential, and, in the case of plate 214, through a load resistor 216, as well. The plate 214 is also connected to a horizontal sweep generator 217, which produces a saw-toothed wave form 218** at the horizontal repetition rate.

In operation, the diodes 193 and 194 operate alternately depending on whether a positive or negative voltage is applied to the center tap **197*a* of the resistor 197. If a positive voltage is applied to this point, the upper diode 193 conducts, and the lower diode 194 is biased off. The positive-going pulses of the wave form 191 are selected and fed into the grid 211 of the triode 206, producing positive pulses of the wave form 219 at the plate 214 of the output tube 207. If the wave form 185 is negative, as applied to the center tap 197*a* of resistor 197, the upper diode 193 is cut off and the lower diode 194 selects negative pulses and feeds them through to the grid 212 of the triode 207 to produce a positive output pulse of wave form 220. It will be noted that the pulses 219 occur at a time half way between the pulses 220. The positive potential is maintained at the center tap 197*a* for one sixtieth of a second and then this point becomes negative for one sixtieth of a second. This produces the desired interlaced horizontal sweep when these pulses 219 and 220 are applied to the horizontal sweep generator 217**.

If an interlaced scan is not required, the pulse polarity selector 192 and the differentiator 188—190 may be eliminated and the output of the multiplier 186 applied directly to the horizontal sweep generator 217.

This invention is not limited to the particular details of construction, materials and processes described, as many equivalents will suggest themselves to those skilled in the art. It is, accordingly, desired that the appended claims be given a broad interpretation commensurate with the scope of the invention within the art.

What is claimed is:

1. A phase discriminator comprising an integrating circuit, means to apply a first of two signals to be compared in phase to said integrating circuit, means to clamp said integrating circuit to a reference potential at a predetermined point in the cycle of the second of the two compared signals comprising a phase splitter for the second signal reproducing the second signal in opposing phases, means to couple each phase to the integrating circuit comprising a rectifier and a capacitor in series with an impedance connected between the coupling circuits having a center tap connected to a reference potential to develop across the integrating circuit a potential determined by the phase difference between the two signals.

2. A phase discriminator comprising an integrating circuit, means to apply a first of two signals to be compared in phase to said integrating circuit, means to clamp said integrating circuit to a reference potential at a predetermined point in the cycle of the second of the two compared signals comprising an electron discharge device having a cathode, a grid and a plate, means for applying the second of said signals to the grid, and means for coupling the signal appearing at the plate in one phase and appearing at the cathode in the other phase to the integrating circuit over separate circuits, each comprising a rectifier of opposing polarity and a capacitor in series with an impedance connected between the circuits having a center tap connected to a reference potential to clamp said integrating circuit to the reference potential on the center tap of the impedance joining the rectified coupling circuits to develop across the integrating circuit a potential determined by the phase difference between the two signals.

3. A system for obtaining energy at a frequency proportional to the relative velocity of two elements of the system comprising a first source of radio frequency energy, means for propagating this energy, a remote receiver for receiving said energy, a second source of radio frequency energy at the remote location of the receiver adapted to emit radio frequency energy under control of the receiver at a frequency different from that of the first source, a second receiver at the location of the first source adapted to receive the energy of the second source as modified by the relative velocity of the second source and the second receiver, a third source of radio frequency energy at the frequency of the second source at the location of the first source, a fourth source of radio frequency energy at the first location, means to maintain the frequency at this fourth source at the frequency of the signal received by the second receiver comprising a phase discriminator comprising an integrating circuit, means to apply the output of the second receiver to said integrating circuit, means to apply signals from the fourth source to said integrating circuit, means to clamp said integrating circuit to a reference potential at a predetermined point in the cycle of the output of the second receiver to develop a control voltage across the integrating circuit that varies with the relative phase of the outputs of the fourth source and the second receiver, means to apply said control voltage to the frequency-determining circuit of said fourth source to maintain the frequency of said source at that of the received signal, and means to mix the output of the controlled signal with that of the third source to produce a signal of a frequency equal to the frequency shift due to the relative velocity of the second transmitter and the second receiver.

4. In a television receiver, means for deriving synchronizing pulses at the horizontal repetition rate from synchronizing pulses at the vertical rate comprising means for deriving pulses having half the repetition rate of the vertical synchronizing pulses, a voltage-controlled source of synchronizing pulses having a free-running repetition rate approximating that of the desired horizontal synchronizing pulses, a phase discriminator comprising an integrating circuit, means to apply the output of the controlled source to said integrating circuit, means to clamp said integrating circuit to a reference potential at a predetermined point in the cycle of the pulse at half the repetition rate of the vertical pulses to develop across the integrating circuit a control voltage determined by the difference in phase between the vertical and horizontal synchronizing pulses, and means to apply this varying voltage to the frequency-determining circuit of the horizontal synchronizing pulse generator to produce horizontal synchronizing pulses in phase with the vertical synchronizing pulses.

5. In a television receiver, means for deriving interlaced synchronizing pulses at the horizontal repetition rate from synchronizing pulses at the vertical rate comprising means for deriving pulses symmetrical about the zero reference voltage having half the repetition rate of the vertical synchronizing pulses, a voltage-controlled source of synchronizing pulses having a free-running repetition rate approximating that of the desired horizontal synchronizing pulses, a phase discriminator comprising an integrating circuit, means to apply the pulses of the horizontal rate to the integrating circuit, means to clamp said integrating circuit to a reference potential at a predetermined point in the cycle of the pulse at half the repetition rate of the vertical pulses to develop across the integrating circuit a control voltage determined by the difference in phase between the vertical and horizontal synchronizing pulses, means to apply said varying voltage to the control circuit of the source of horizontal synchronizing pulses, means to differentiate the horizontal synchronizing pulses, and means under control of the output of the pulses at half the vertical repetition rate to select pulses from the differentiator for half a vertical period and negative pulses from said differentiator for the other half of said interval to produce interlaced horizontal synchronizing pulses.

6. In an automatic frequency control circuit, a source of controlling frequency, a voltage-controlled source of sinusoidal oscillations, a phase discriminator comprising an integrating circuit, means to apply the output of the source of controlling oscillations to said integrating circuit, means to apply a portion of the output of the controlled sinusoidal oscillator to said integrating circuit, means to clamp said integrating circuit to a reference potential at a predetermined point in the cycle of the output of the controlling oscillator comprising a phase splitter for the output of the source of the controlling frequency reproducing this output in opposing phases, means to couple each phase to the integrating circuit comprising a rectifier and a capacitor in series with an impedance inserted between the coupling circuits having a center tap connected to a reference potential to develop across the integrating circuit a control voltage that varies as the relative phase of the output of the controlled and controlling oscillators, and means to apply said voltage to the frequency control circuit of said controlled sinusoidal oscillator to maintain the frequency of its output at an integral multiple of the frequency of the controlling oscillator.

References Cited in the file of this patent

UNITED STATES PATENTS

| | | |
|---|---|---|
| 2,399,421 | Artzt | Apr. 30, 1946 |
| 2,511,146 | Beste | June 13, 1950 |
| 2,522,919 | Artzt | Sept. 19, 1950 |
| 2,563,816 | Butman | Aug. 14, 1951 |
| 2,566,762 | English | Sept. 4, 1951 |
| 2,628,279 | Roe | Feb. 10, 1953 |
| 2,645,717 | Massman | July 14, 1953 |